F. KUTSCHER.

Bottle-Stoppers.

No. 5,747. Reissued Jan. 27, 1874.

Witnesses

J. L. Shumway

A. J. Tibbits

Frederick Kutscher
Inventor

By Atty.

John E. Earle

AM. PHOTO-LITHOGRAPHIC Co. N.Y. (OSBORNE'S PROCESS)

UNITED STATES PATENT OFFICE.

FREDERICK KUTSCHER, OF NEW HAVEN, CONNECTICUT.

IMPROVEMENT IN BOTTLE-STOPPERS.

Specification forming part of Letters Patent No. 136,326, dated February 25, 1873; reissue No. 5,747, dated January 27, 1874; application filed April 30, 1873.

*To all whom it may concern:*

Be it known that I, FREDERICK KUTSCHER, of New Haven, in the county of New Haven and State of Connecticut, have invented a new Improvement in Bottle-Stopper; and I do hereby declare the following, when taken in connection with the accompanying drawings and the letters of reference marked thereon, to be a full, clear, and exact description of the same, and which said drawings constitute part of this specification, and represent, in—

Figure 1:
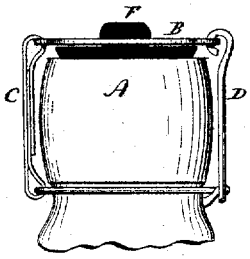
Figure 2:
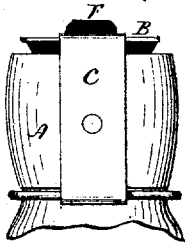
Figure 3:
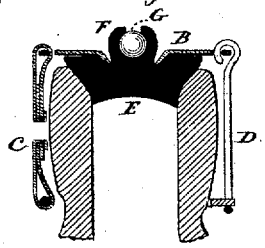
Figure 4:
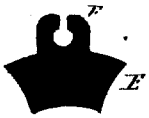

Figure 1, a side view; Fig. 2, a view of the same turned one-fourth around; Fig. 3, a vertical central section of the neck of the bottle with the stopper applied; Fig. 4, a vertical section of the plug; and in Fig. 5, a vertical section of the same as applied to the covering-plate.

This invention relates to an improvement in the bottle-stopper for which Letters Patent were granted to me June 15, 1869, the object being, first, to avoid the necessity of a rivet passing through the plug; and, second, to insure the more perfect closing of the neck of the bottle. The invention consists, first, in constructing the stopper with a central upward projection, to extend through the covering-plate, and there be expanded by inserting into the recess of the said projection a ball or its equivalent; second, in constructing the plug of a dome shape upon its upper surface, so that the conical portion of the plate-bearing at or near the center of the plug will have a greater expanding power than a flat surface, as in my former patent; third, in making the under surface of the plug concave, whereby the lower edge is allowed to expand to fill the neck.

Figure 5:
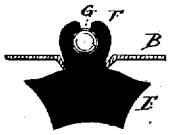

A is the neck of the bottle; B, the covering-plate, the under side of which is made conical, preferably, by depressing from the upper side down. A perforation through the center of this cone is formed for securing the plug. The plate B is hinged to the bottle by a link, C, and a loop, D, in substantially the same manner as in my former patent, with this difference—that in my former patent the link C was formed from wire hooked into the plate and to the bottle, which construction would allow the stopper to swing to the right or left, and did not serve as a guide in bringing the stopper to the proper position. I now form the link C from sheet metal, looping it around the wire at the neck of the bottle to form a hinge at that point, and, through a slit in the plate B, securing the two ends, as seen in Figs. 1, 2, and 3. This link is of sufficient width to form a hinge of such length as to prevent the lateral movement or swinging of the stopper out of its proper line, and when the stopper is brought over the bottle it insures its proper central position, and when open also insures the stopper flying directly back, as denoted in broken lines, instead of the uncertainty as to which way it will turn when the wire link is employed. The plug E is made from india-rubber or similar elastic material, and is formed with a projection, F, upon the upper side to pass through the perforation in the center of the plate B, and this projection has a cavity in the center, and, when passed through the plate, a ball, G, or its equivalent, is inserted into the said cavity, causing the expansion of the said projection, as seen in Fig. 5, so as to prevent the removal of the plug from the plate. If the upper surface of the plug be made flat, as in my former patent, the edge of the plug strikes the plate so soon after the compression of the plug commences that it is difficult to attain the desired degree of expansion. To overcome this difficulty, I make the upper surface of the plug convex, as seen in Figs. 4 and 5; hence, when the compression takes place, the edge is the last portion of the surface to strike the plate, and the expansion will continue until the edge comes in contact with the plate.

In my former patent the under surface of the plug was necessarily flat; hence the compression of the plug into the neck of the bottle could not expand the lower edge. To overcome this difficulty, and allow the lower end of the plug to perfectly fill the neck, I form the lower surface concave, as seen in Figs. 4 and 5, and, in compressing from the top, the lower edge will expand until the surface becomes perfectly flat, and thus completely fill the neck of the bottle, as seen in Fig. 3.

I do not wish to be understood as broadly claiming hinging the stopper and its plate to a neck-wire, as such, I am aware, is not new.

I claim as my invention—

1. In combination with the plate B, the plug

E, constructed with the projection F, to extend through the plate, and with a cavity in the said projection filled to expand the said projection, substantially as described.

2. The plug E, constructed of a convex form upon its upper surface, combined with the plate B, having a downward conical projection, substantially as and for the purpose specified.

3. In combination with the plate B, constructed with a downward conical projection, the plug E, constructed with a concavity upon its lower surface, substantially as and for the purpose set forth.

4. In combination with the plate B, perforated, the plug E, formed with a projection, F, extending up through the plate, by means of which the plug is secured to the plate.

FREDERICK KUTSCHER.

Witnesses:
J. H. SHUMWAY,
A. J. TIBBITS.